US008326867B2

(12) United States Patent
Takai

(10) Patent No.: US 8,326,867 B2
(45) Date of Patent: Dec. 4, 2012

(54) APPARATUS FOR GENERATING JOB NETWORK FLOW FROM JOB CONTROL STATEMENT DESCRIBED IN JOB CONTROL LANGUAGE AND ITS METHOD

(75) Inventor: Shinji Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 1041 days.

(21) Appl. No.: 12/021,615

(22) Filed: Jan. 29, 2008

(65) Prior Publication Data
US 2008/0288920 A1 Nov. 20, 2008

(30) Foreign Application Priority Data

Feb. 19, 2007 (JP) ................. 2007-038025

(51) Int. Cl.
G06F 7/00 (2006.01)
G06F 17/30 (2006.01)
(52) U.S. Cl. ........................ 707/770; 395/615
(58) Field of Classification Search .................... 717/114
See application file for complete search history.

(56) References Cited

U.S. PATENT DOCUMENTS

| 5,678,044 | A  | * | 10/1997 | Pastilha et al. ............. 395/615 |
| 6,029,002 | A  | * | 2/2000  | Afifi et al. ................... 717/131 |
| 6,523,027 | B1 | * | 2/2003  | Underwood ........... 707/999.009 |
| 7,100,195 | B1 | * | 8/2006  | Underwood .................... 726/2 |
| 7,234,118 | B1 | * | 6/2007  | Bleizeffer et al. ............ 715/764 |
| 7,831,693 | B2 | * | 11/2010 | Lai ............................... 709/220 |
| 2003/0177146 | A1 | * | 9/2003 | Zimowski ................. 707/999.2 |
| 2008/0222734 | A1 | * | 9/2008 | Redlich et al. .................. 726/26 |
| 2009/0240704 | A1 | * | 9/2009 | Zimowski ................. 707/999.1 |

FOREIGN PATENT DOCUMENTS

| JP | 1-237726 A    | 9/1989  |
| JP | 5-265731 A    | 10/1993 |
| JP | 6-59913 A     | 3/1994  |
| JP | 08-147156 A   | 6/1996  |
| JP | 09-319586 A   | 12/1997 |
| JP | 11-024913 A   | 1/1999  |
| JP | 2000112773 A  | 4/2000  |
| JP | 2006302135 A  | 11/2006 |
| WO | 9533235 A1    | 12/1995 |

OTHER PUBLICATIONS

Japanese Office Action for JP2007-038025 dated Feb. 18, 2009.

* cited by examiner

Primary Examiner — Isaac Tecklu
Assistant Examiner — Mohammad Kabir

(57) ABSTRACT

An object of the present invention is to convert JCL files into a job network without manual labor.

An apparatus interprets dependency between JCL files as a logical expression, performs deduction for the logical expression to solve the dependency, and converts the JCL files into a job network in consideration of the above information. The apparatus reads the JCL files, analyzes dependency between the JCL files, and interprets the dependency as a logical expression. The apparatus expresses the logical expression obtained by interpreting the dependency using an algorithm in a list form. The apparatus reads the JCL files, converts the JCL files into intermediate files, and converts the intermediate files into a job network. The apparatus divides the intermediate file into parts based on a JCL command left in the intermediate file and converts the JCL command into components of the job network to generate a job network flow.

9 Claims, 18 Drawing Sheets

BASE (FACT) SET

JCL FILE SET HAVING
NO DEPENDENCY

BASE SET B $B = \{B1, B2, B3, ....\}$

BASE SET (LIST)

LOGICAL EXPRESSION (UNSOLVED) SET
JCL FILE SET HAVING ANY DEPENDENCY

LOGICAL EXPRESSION SET R

LOGICAL EXPRESSION SET (LIST)

※ JNW : JOB NETWORK

APPARATUS FOR GENERATING JOB NETWORK FLOW FROM JOB CONTROL STATEMENT DESCRIBED IN JOB CONTROL LANGUAGE AND ITS METHOD

This application is based upon and claims the benefit of priority from Japanese patent application No. 2007-038025, filed on Feb. 19, 2007, the disclosure of which is incorporated herein in its entirety by reference.

BACKGROUND OF THE INVENTION

1. Field of the Invention

The present invention relates to an apparatus for generating a job network flow from job control statements described in a job control language, its method and program.

2. Description of the Related Art

Recently there has been a blossoming of system migration from Mainframe to Open-system using UNIX® server or universal OS such as Windows® in many enterprises.

In such system migration, handling of job assets that have been managed on the Mainframe is an important issue.

Such job assets are typically described in a job control language (JCL). However, the JCL is not available on the Open-system, so that it is necessary to convert the JCL into a language such as UNIX® shell script and to substitute a JCL command with a job network flow.

In general, the conversion from the JCL into job network is manually performed by system engineers and the like.

However, considerable man-hours are required to manually converting several thousands of JCL files into the job network. Further, a great number of bugs may occur through manual labour, involving tests for detecting the bugs, with the result that migration cost becomes extremely high.

[Patent Document 1] JP-A-11-024913

The first problem is that the manual migration work from the JCL to job network suffers from human-induced errors which lead to quality degradation and consume considerable cost due to a test work performed for restoring the quality degradation.

The second problem is as follows. Originally, there are various dependencies between the JCL files. More specifically, for example, execution of one JCL file must be completed in order to start execution of another JCL file. In an environment where there exist, e.g., several thousands of the JCL files, a few engineers grasp the existence of such dependencies or the contents of the dependencies. Therefore, considerable cost is incurred in order to investigate the dependencies. This adds further cost and risk to the migration work.

Further, even if a simple conversion tool is created and used, a large number of errors may occur due to existence of dependencies in the actual test time and, in the end, the cause of errors must be investigated and corrected though manual labour. As a result, a cost reduction effect cannot be achieved.

SUMMARY OF THE INVENTION

An object of the present invention is therefore to convert the JCL files into a job network without manual labour.

According to the present invention, there is provided a JCL file/job network conversion method, comprising: interpreting dependency between JCL files as a logical expression; performing deduction for the logical expression to solve the dependency; and converting the JCL files into a job network in consideration of the above information.

The above JCL file/job network conversion method may read the JCL files, analyze dependency between the JCL files, and interpret the dependency as a logical expression.

The above JCL file/job network conversion method may express the logical expression obtained by interpreting the dependency using an algorithm in a list form.

The above JCL file/job network conversion method may read the JCL files, convert the JCL files into intermediate files, and convert the intermediate files into a job network.

The above JCL file/job network conversion method may divide the intermediate file into parts based on a JCL command left in the intermediate file and convert the JCL command into components of the job network to generate a job network flow.

According to the present invention, it is possible to convert the JCL files into a job network without manual labour, thereby reducing cost of conversion operation.

DETAILED DESCRIPTION OF THE PREFERRED EMBODIMENTS

A preferred embodiment of the present invention will be described in detail below with reference to the accompanying drawings.

Figure 1:
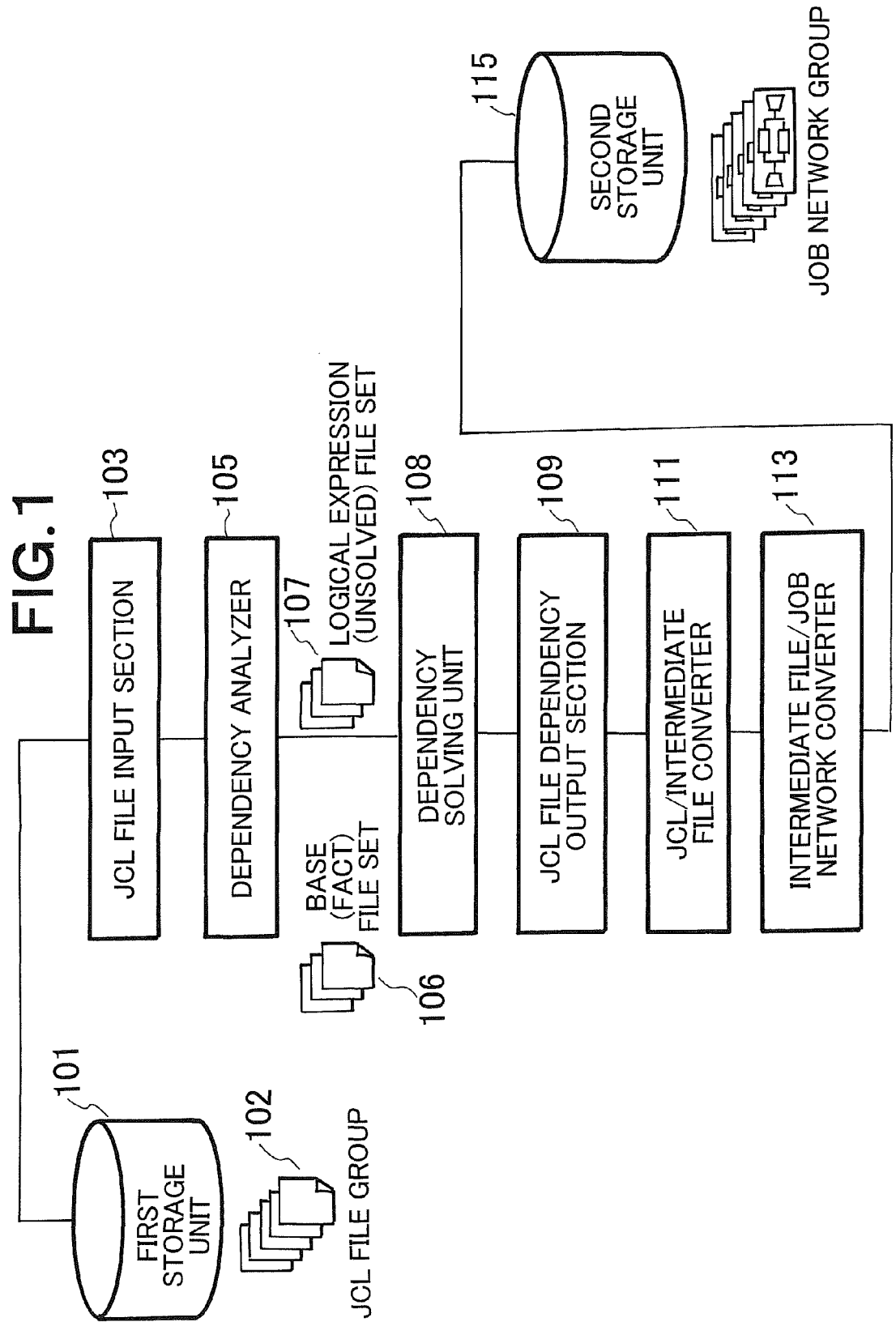
FIG. 1 is a block diagram showing a configuration of an apparatus of an embodiment of the present invention for generating a job network from a job control language.

A first storage unit 101 of FIG. 1 stores a JCL file group 102 to be converted.

A JCL file input section 103 of FIG. 1 reads out target JCL files from the first storage unit 101 and sends them to a dependency analyzer 105.

Figure 2:
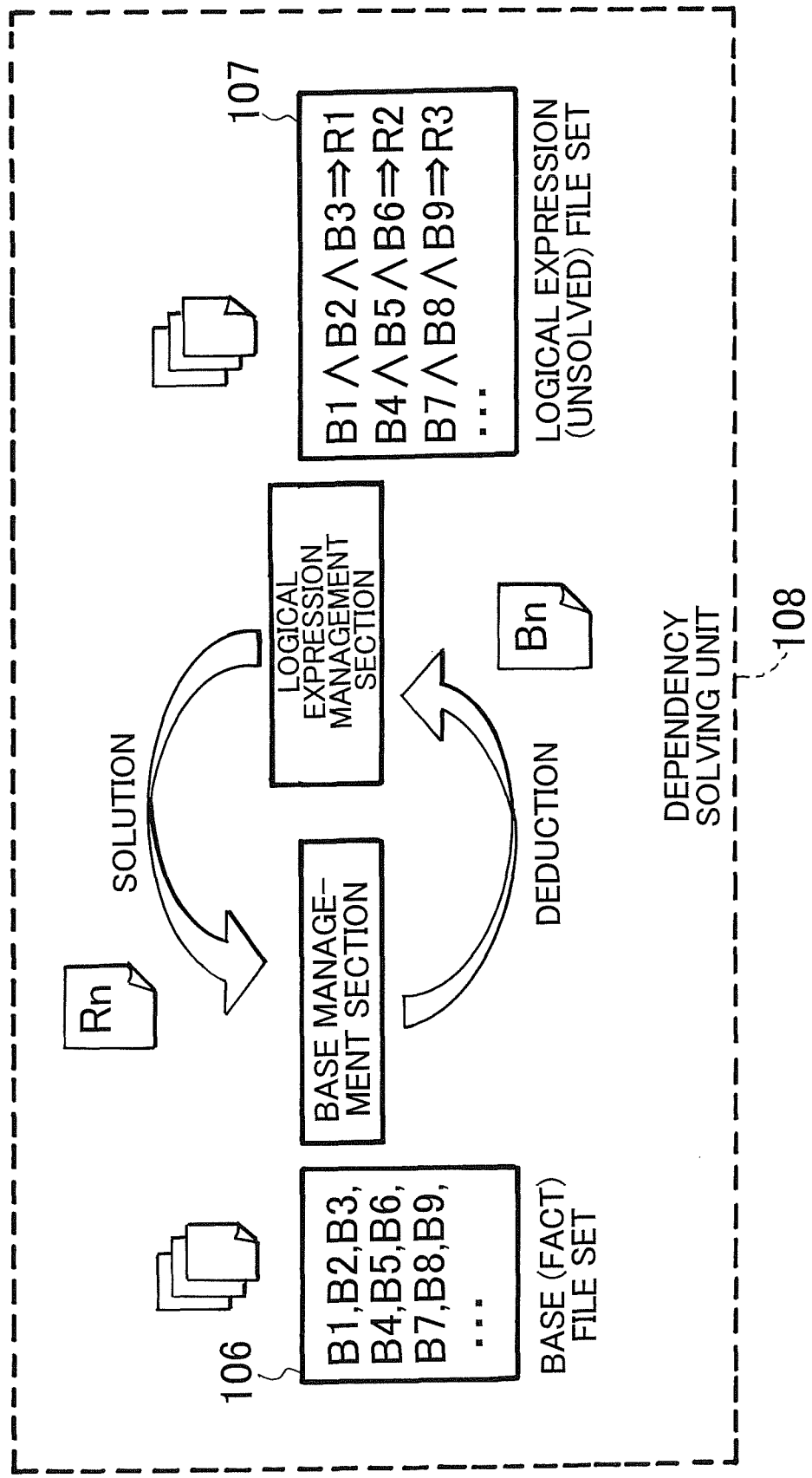
FIG. 2 is a block diagram showing a configuration of a dependency solving unit shown in FIG. 1.

The dependency analyzer 105 reads, one by one, the received JCL files, checks the existence of dependencies between the JCL files and contents of the dependencies, and develops them on a memory. At this time, JCL files that have no dependency are utilized as a base (fact) set 106 (FIG. 2) for deduction. Conversely, as to JCL files each having dependency, the dependency thereof is expressed as a logical expression. For example, when a dependency "JCL files B1, B2, and B3 need to previously be executed before execution of JCL file R1" has been detected as a result of dependency analysis, this dependency is expressed as "B1∧B2∧B3→R1". The set having such dependency is expressed as a logical expression file set 107 (FIGS. 1 and 2). The dependency analyzer 105 sends two sets (base (fact) file set 106 and logical expression (unsolved) file set 107) to a dependency solving unit 108.

A conceptual view of the dependency solving unit 108 is shown in FIG. 2.

The dependency solving unit 108 picks up one base file from the base file set 106 and applies it to the logical expression file set 107 so as to perform deduction.

Assuming that there exists a logical expression "B1∧B2∧B3→R1" and that a fact (base) "B1" exists in the base set, this logical expression is simplified to "B2∧B3→R1" by automatic deduction, since inclusion of B1 in the logical expression is obvious. After such automatic deduction is applied to all elements (logical expressions) of the logical expression (unsolved) file set 107, a fully converged result (Result) is obtained. For example, when B2 is applied to a logical expression "B2→R1", Result "R1" is obtained. Such a Result is added to the base file set 106 as a newly found fact and utilized as a base for subsequent deduction.

Such automatic deduction is repeatedly applied to all elements of the base file set 106. It is logically guaranteed that there is no dependency between JCL files constituting the base file set 106 obtained as a result of the automatic deduction or that dependencies between the JCL files have fully been solved (guarantee of integrity of deduction).

A JCL file dependency output section 109 sends the JCL file group (base file set 106) obtained as a result of the automatic deduction to a JCL/intermediate file converter 111. Further, the JCL file dependency output section 109 displays an alarm indicating that there is a problem in the dependency between elements of the logical expression (unsolved) file set 107.

The entire configuration of the present invention is shown in FIG. 1.

As shown in FIG. 1, an apparatus according to the present embodiment includes: a first storage unit 101 that stores a JCL file group to be converted; a JCL file input section 103 that reads out the JCL file group to be converted from the first storage unit 101; a dependency analyzer 105 that analyzes the JCL file group to grasp dependencies between the JCL files, separates the JCL files into two sets, and develops them on a memory; a dependency solving unit 108 that performs automatic deduction using the separated two sets; a JCL file dependency output section 109 that sends a base set obtained as a result of the automatic deduction to a JCL/intermediate file converter 111 and displays an alarm concerning elements of the logical expression file set; a JCL/intermediate file converter 111 that converts the JCL file group transmitted from the JCL file dependency output section 109 into an intermediate file group; and an intermediate file/job network converter 113 that converts the intermediate file into a job network and stores the job network in a second storage unit 115.

Figure 3:
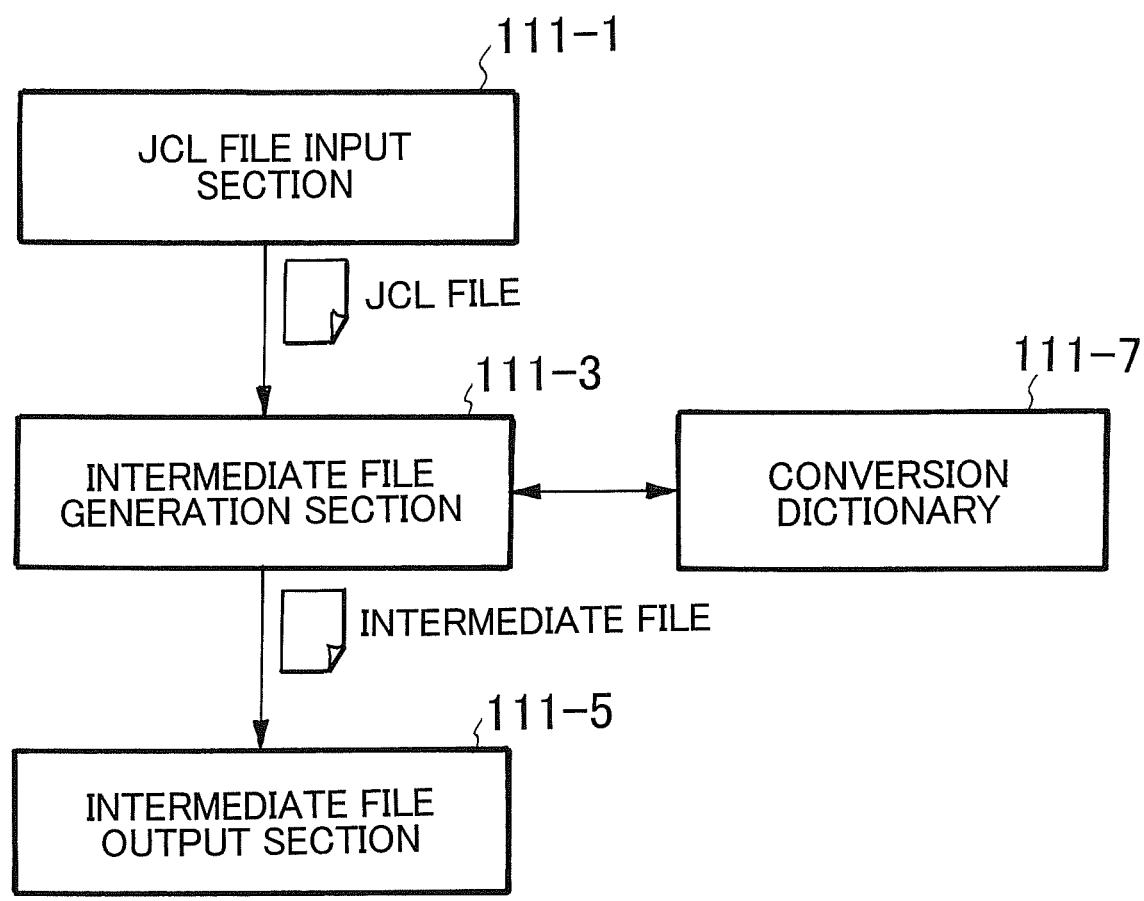
FIG. 3 is a block diagram showing a configuration of a JCL/intermediate file converter shown in FIG. 1.

FIG. 3 shows a configuration of the JCL/intermediate file converter 111. The JCL/intermediate file converter 111 includes a JCL file input section 111-1 that picks up a JCL file from a storage unit, an intermediate file generation section 111-3 that converts the received JCL file into an intermediate file, and an intermediate file output section 111-5 that stores the generated intermediate file into a storage unit. The intermediate file generation section 111-3 has a previously prepared conversion dictionary 111-7. A correspondence table between JCL and shell script is stored in the conversion dictionary 111-7. The intermediate file generation section 111-3 performs conversion with reference to the dictionary.

Figure 4:
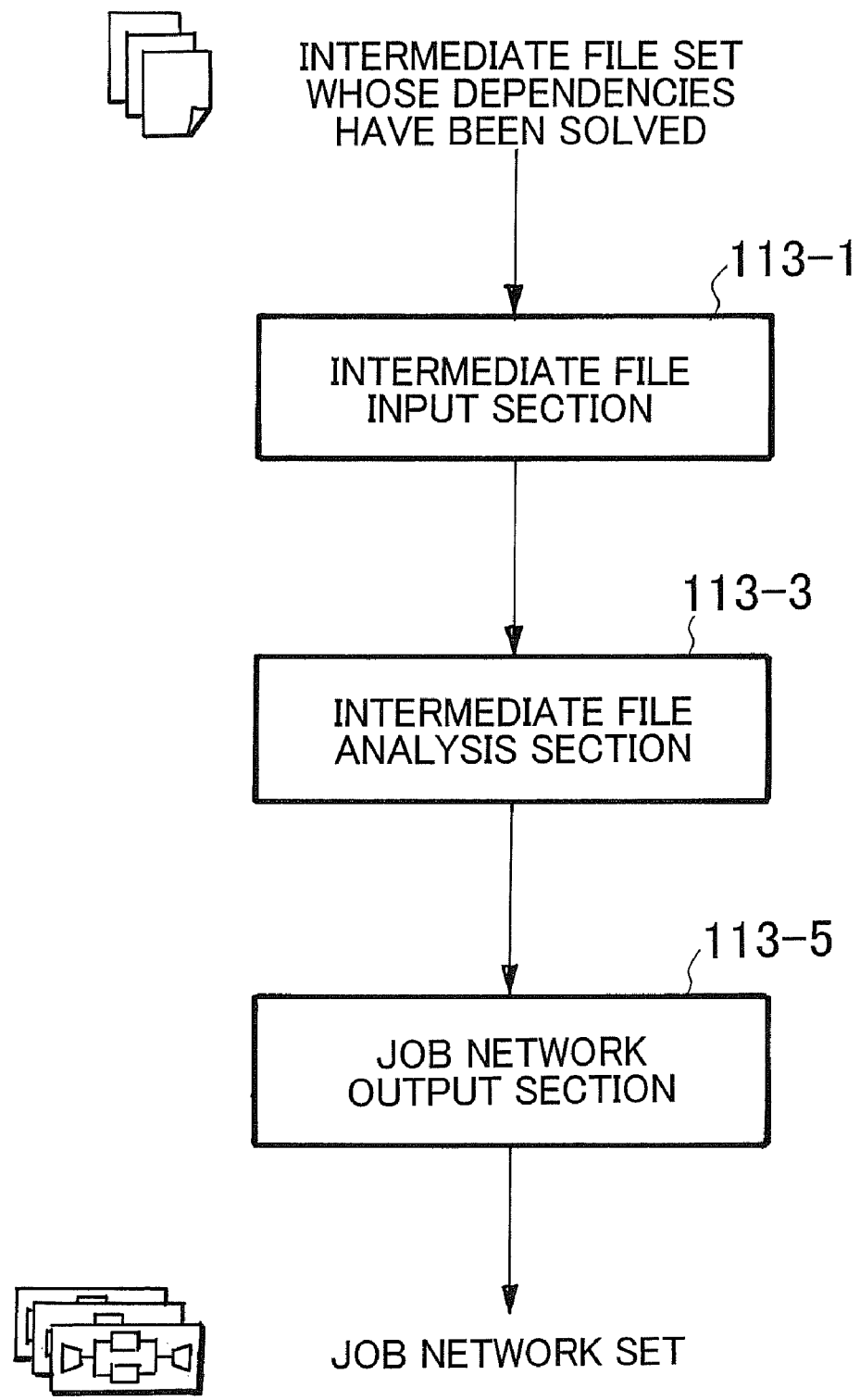
FIG. 4 is a block diagram showing a configuration of an intermediate file/job network converter shown in FIG. 1.

FIG. 4 shows a configuration of the intermediate file/job network converter 113. The intermediate file/job network converter 113 includes an intermediate file input section 113-1 that picks up a necessary intermediate file group from a storage unit, an intermediate file analysis section 113-3 that analyzes the intermediate file to convert the intermediate file into a job net work, and a job network output section 113-5 that outputs a result to a file system.

The first storage unit 101 of FIG. 1 stores a JCL file group to be converted.

The JCL file input section 103 of FIG. 1 reads out target JCL files from the first storage unit 101 and sends them to the dependency analyzer 105.

Figure 5:
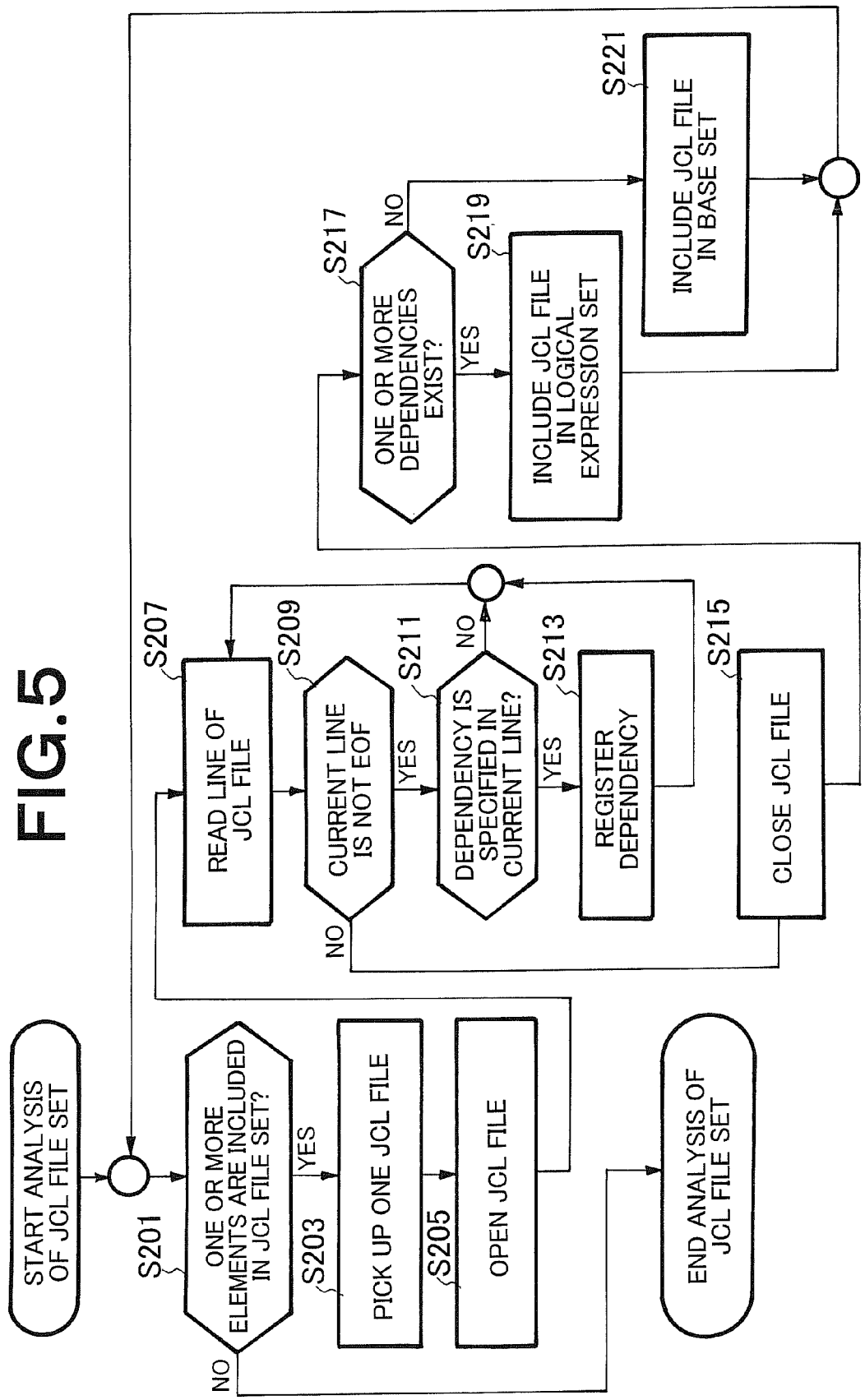
FIG. 5 is a flowchart showing the operation of the dependency solving unit shown in FIG. 1.

The operation of the dependency analyzer 105 is shown in FIG. 5.

The dependency analyzer 105 reads, one by one, the received JCL files (steps S201, S203, and S205), checks the existence (presence or absence) of dependencies between the JCL files (steps S207, S209, S211, S213, and S215).

Figure 6:
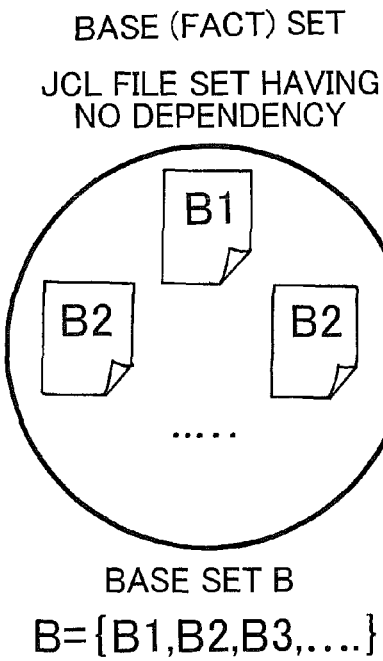
FIG. 6 is a view showing a base (fact) set according to the embodiment of the present invention.
Figure 7:
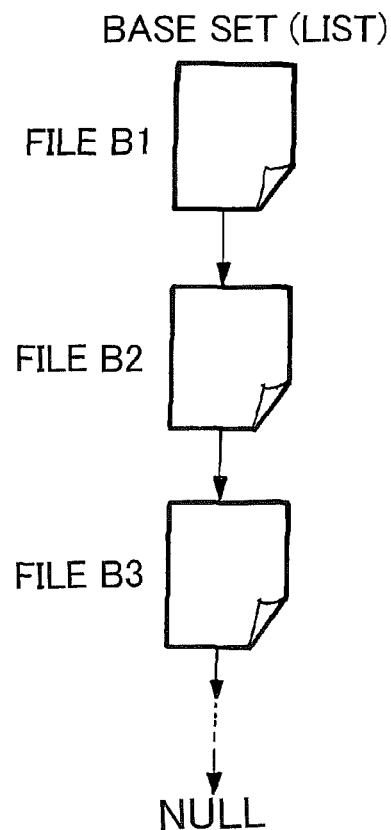
FIG. 7 is a view showing a base set list according to the embodiment of the present invention.

In the case where there is no dependency between the read files, these files are registered as a base (fact) set as shown in FIG. 6 (step 7-11). Actually, the base file set is expressed in a list structure as shown in FIG. 7 on a memory.

Figure 8:
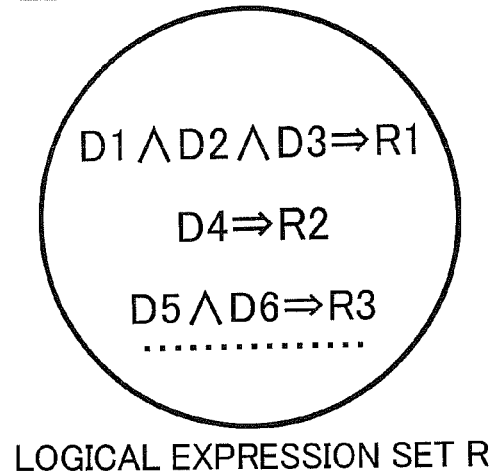
FIG. 8 is a view showing a logical expression set (unsolved) according to the embodiment of the present invention.

In the case where there is any dependency between the read files, the found dependency is interpreted as a logical expression as shown FIG. 8, and these files are registered as a logical expression set, including the found dependency (step S217).

Figure 9:
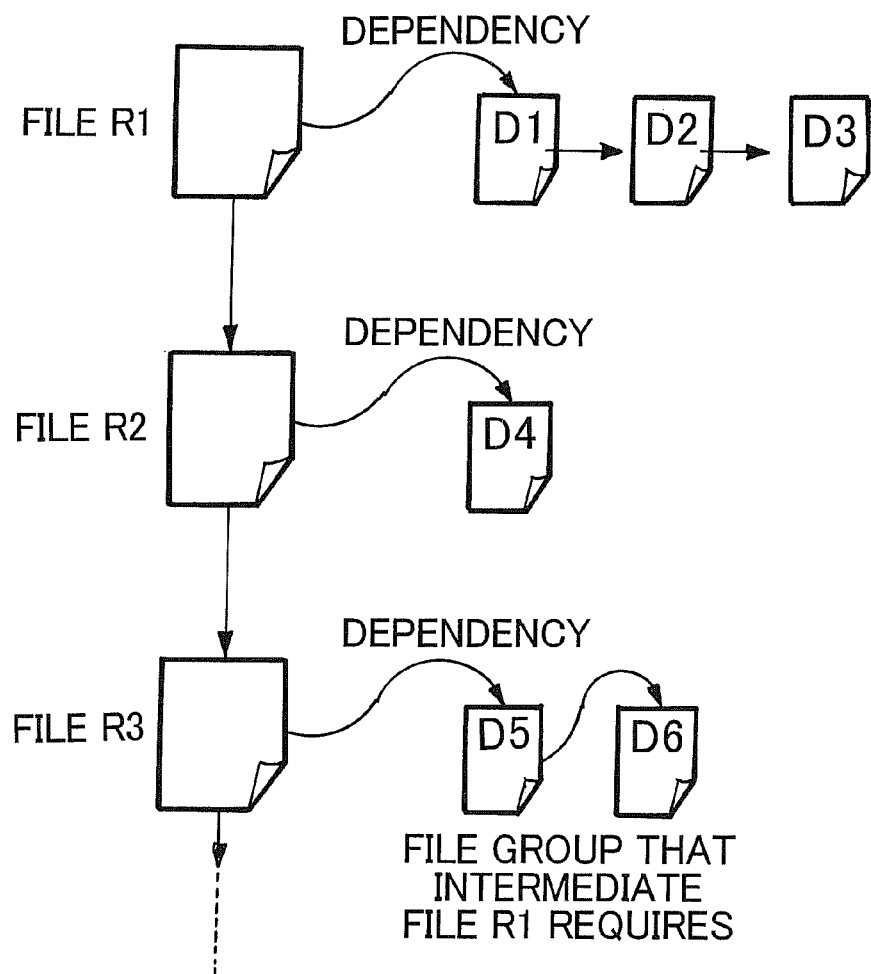
FIG. 9 is a view showing a logical expression set list according to the embodiment of the present invention.

For example, when a dependency "JCL files D1, D2, and D3 need to previously be executed before execution of JCL file R1" has been detected as a result of dependency analysis, this dependency is expressed as "D1∧D2∧D3→R1". Actually, this dependency is expressed in a list structure as shown in FIG. 9.

The dependency analyzer 105 sends two sets (base file set and logical expression file set) to the dependency solving unit 108.

Figure 10:
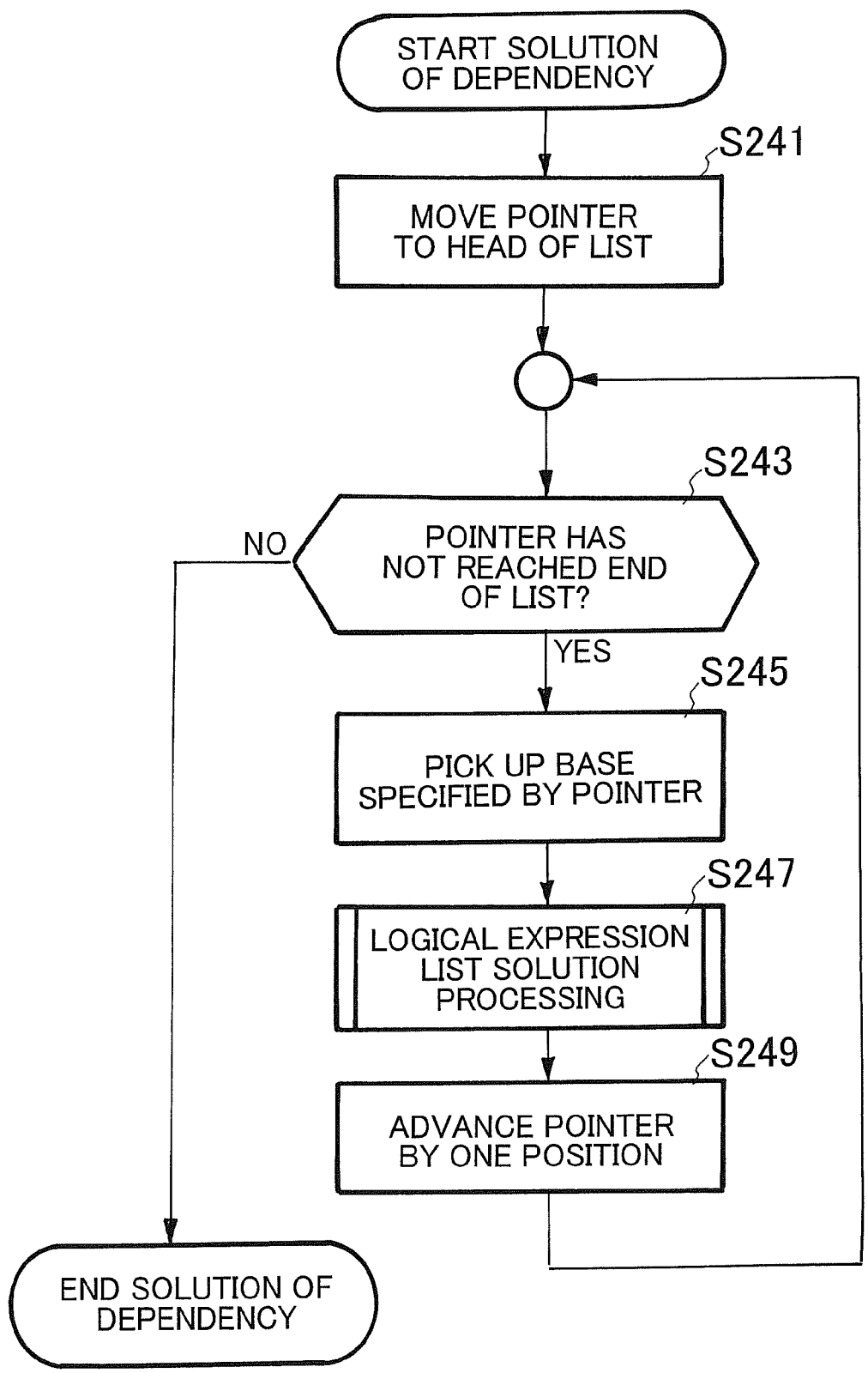
FIG. 10 is a flowchart (1/3) showing the operation of the dependency solving unit shown in FIG. 1.
Figure 11:
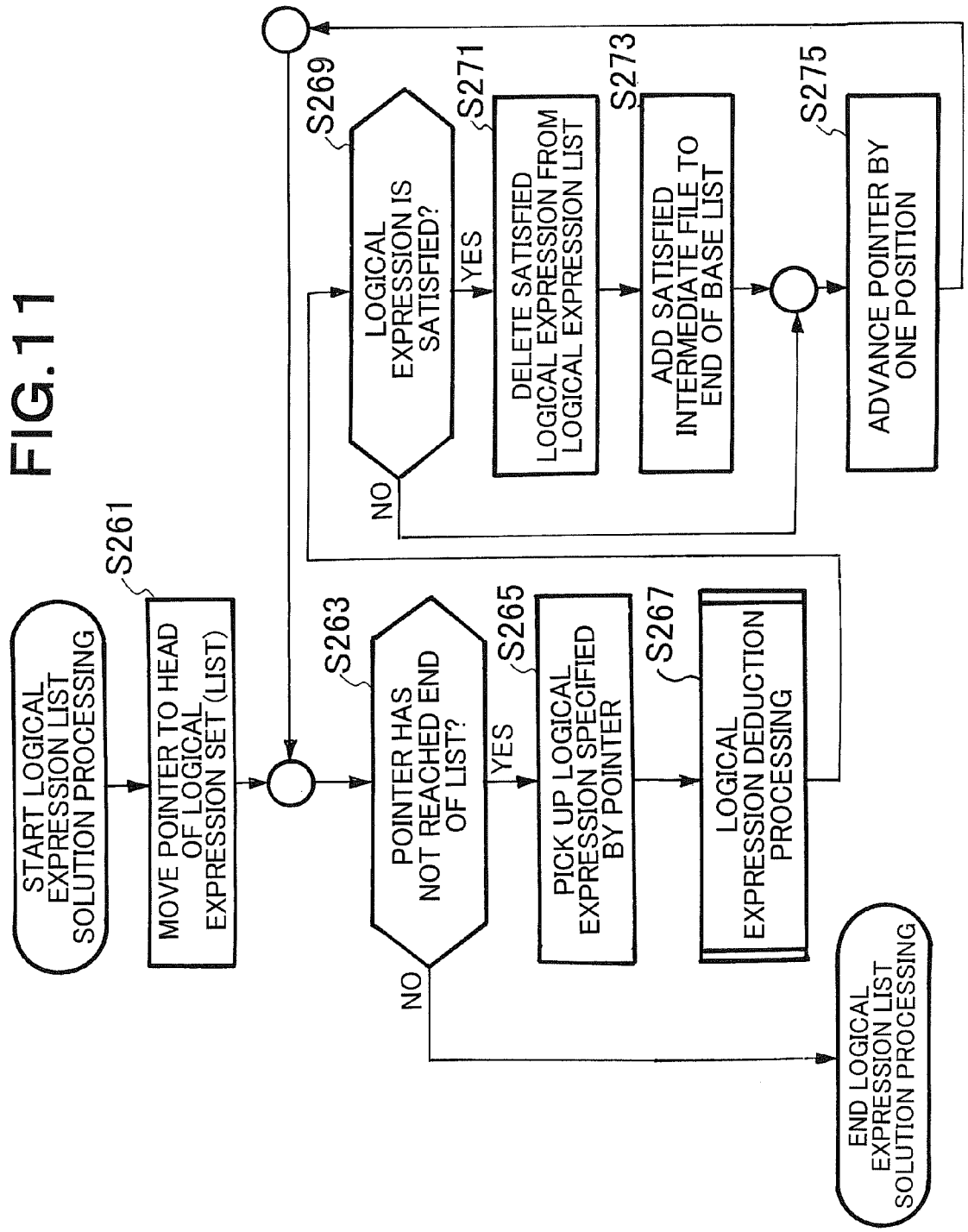
FIG. 11 is a flowchart (2/3) showing the operation of the dependency solving unit shown in FIG. 1.
Figure 12:
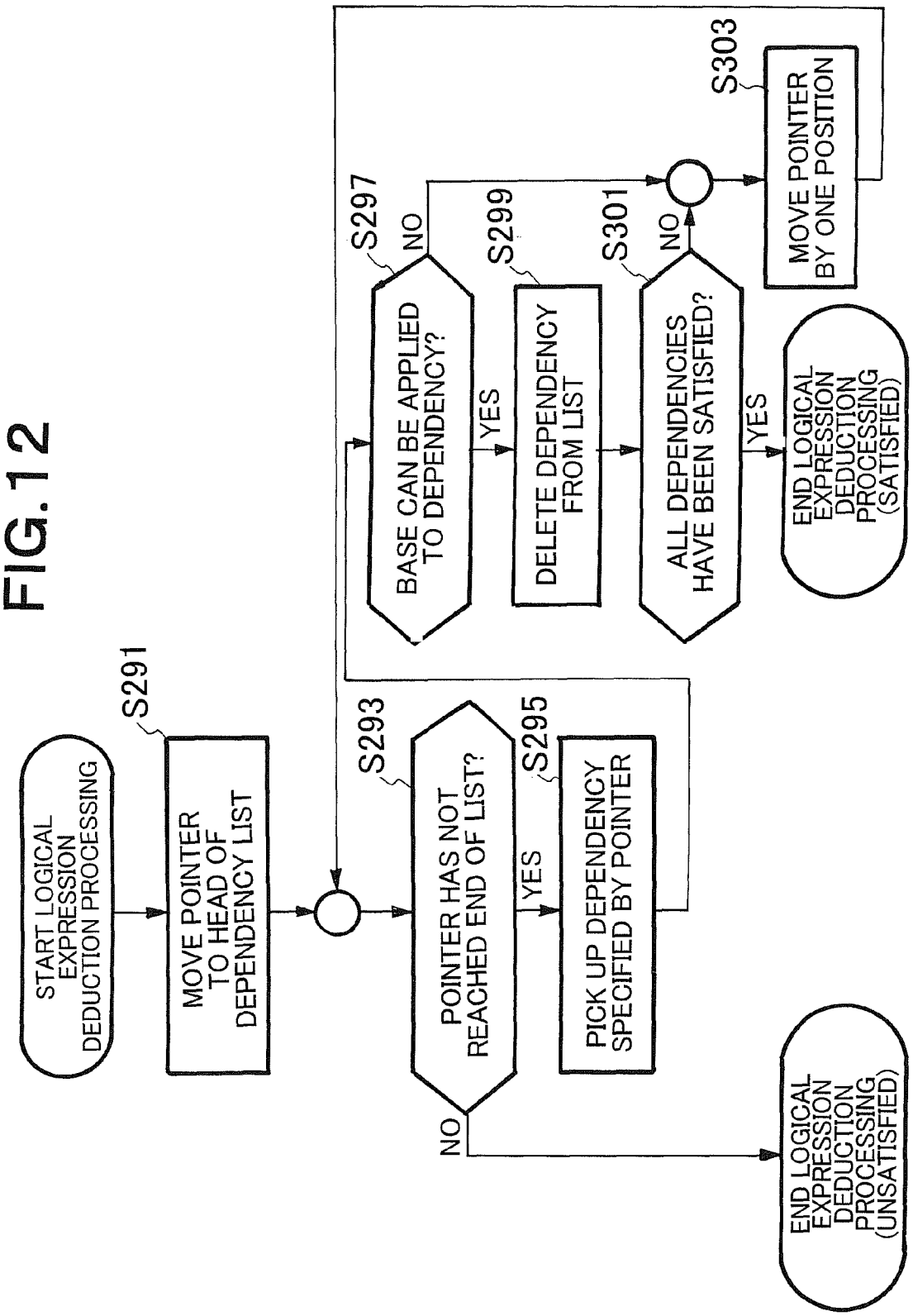
FIG. 12 is a flowchart (3/3) showing the operation of the dependency solving unit shown in FIG. 1.

The operation concept of the dependency solving unit 108 is shown in FIG. 2. The dependency solving unit 108 picks up one base (file) from the base file set 106 and applies it to the logical expression file set 107 so as to perform deduction. A concrete operation of the dependency solving unit 108 shown in FIGS. 1 and 2 is shown in FIGS. 10, 11, and 12.

The dependency solving unit picks up one base (file) from the base set input from the dependency analyzer 105 and tries to apply it to a logical expression set (steps S241, S243, S245, S247, and S249). The details of logical expression list solution processing of step S247 are shown in FIG. 11. The dependency solving unit 108 picks up one logical expression from the logical expression list and tries to make a deduction for the logical expression using the picked up base (steps S263, S265, and S267).

Step S267 is logical expression deduction processing. The details of the logical expression deduction processing are shown in FIG. 12. As shown in FIG. 9, each logical expression has a list of files between which any dependency exists. The dependency solving unit 108 picks up one dependency from the list and tries to apply the base to the picked up dependency (steps S291, S293, S295, and S297).

If the base can be applied to the dependency, it is determined that the dependency has been solved, and this dependency is deleted from the list (step S299). If, as a result, all dependencies have been solved, it is determined that the logical expression is fully satisfied. Then, the logical expression deduction processing is ended (satisfied) in step S267 and the result (JCL file) is forwarded to step S269. In step S269, if the result of step S267 is "satisfied", the dependency solving unit 108 deletes the relevant logical expression from the list and adds the result of the relevant logical expression to the end of the base list (steps S272, and S273). With this, the deduction for one logical expression has been ended, and the flow advances to a deduction for a next logical expression. Thereafter, the above procedure is repeated for all logical expressions (steps S263, S265, S267, S269, S271, S273, and S275). After the completion of the deduction for all elements of the logical expression list, the logical expression list solution processing is ended, and the flow advances to step S249 of FIG. 10 where another base is picked up.

Figure 13:
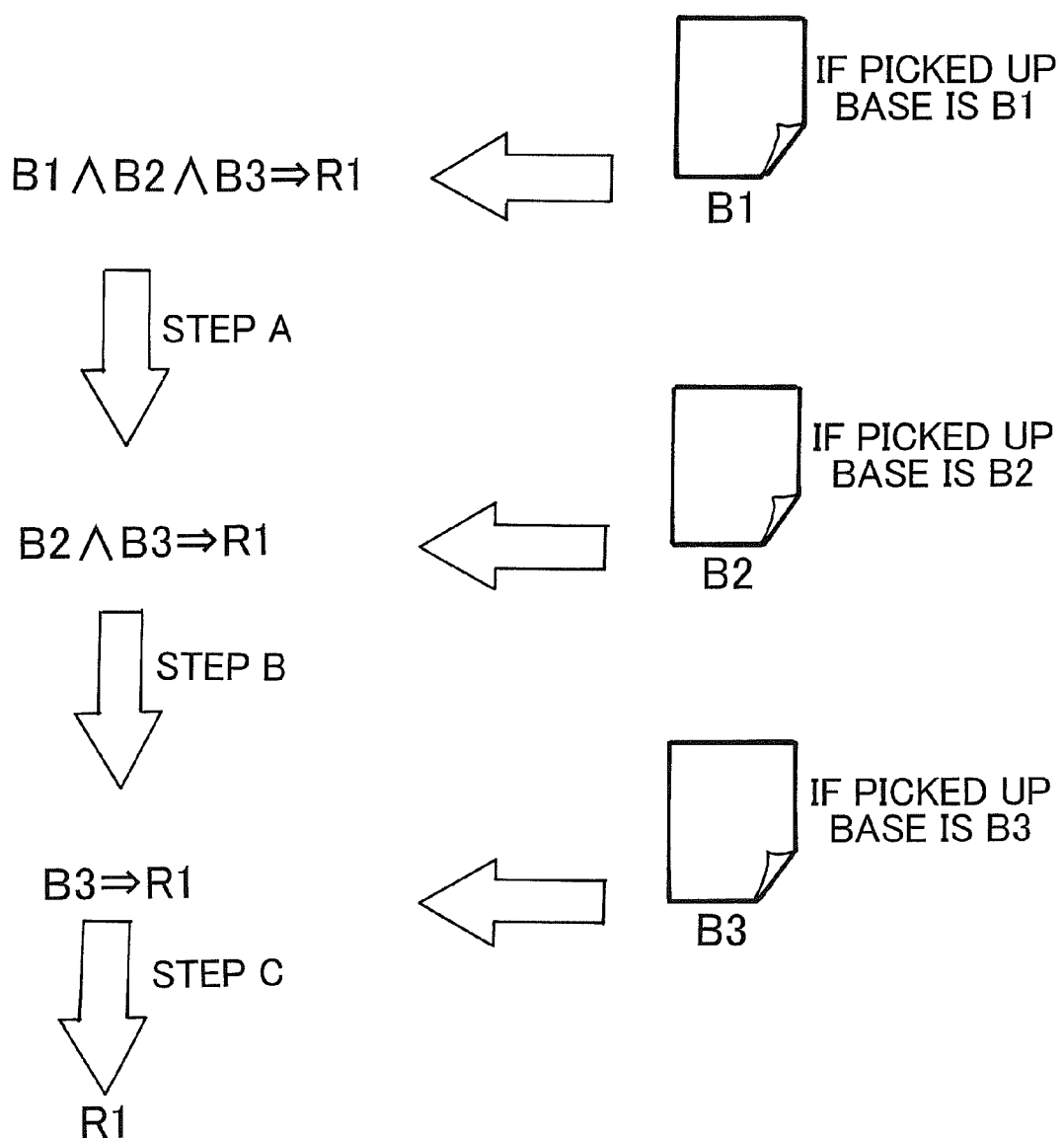
FIG. 13 is a view showing deduction solution using the base set according to the embodiment of the present invention.

The above deduction flow will be described with reference to FIG. 13. In FIG. 13, if a picked up base is B1, a dependency B1 is deleted by step A to thereby simplify the logical expression. Further, if a base picked up next is B2, a dependency B2 is deleted by step B. If a base picked up finally is B3, a Result R1 is obtained by step C. This Result R1 is added to the end of the base set as a new base.

The above automatic deduction is repeated for all elements of the base set as shown in FIG. 10. The elements (JCL files) finally obtained as a result of the automatic deduction are files for which it is logically guaranteed that there is no dependency or that, if there is any dependency, the existing dependency has fully been solved. Thus, it is guaranteed that no errors will occur in these files in terms of dependency. Then, the JCL file dependency output section 109 passes the obtained list to the JCL/intermediate file converter 111.

Conversely, since it is obvious that problems will occur in the elements (JCL files) of the finally obtained logical expression set in terms of dependency, the JCL file dependency output section 109 issues an alarm to an operator before performing conversion.

Figure 14:
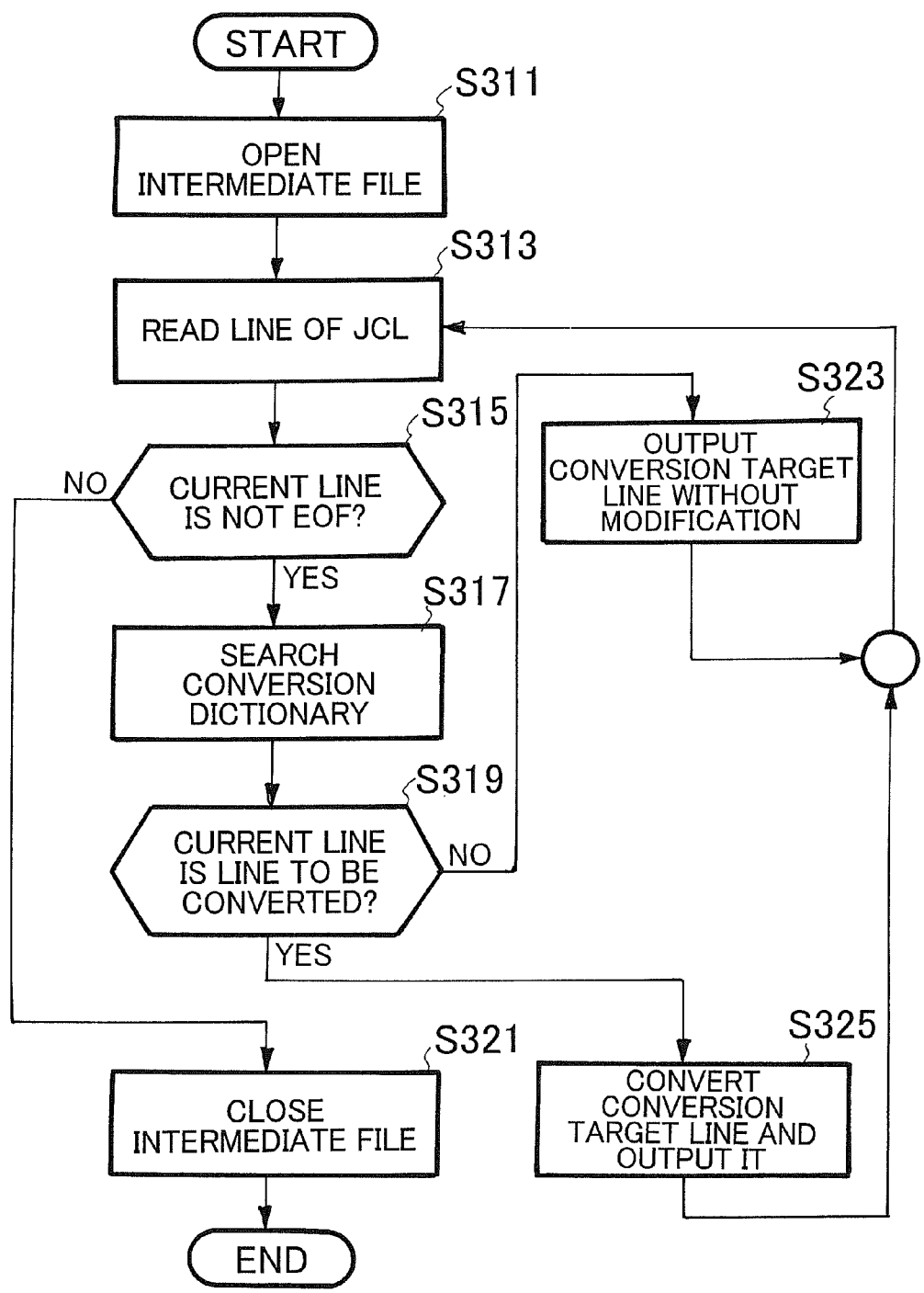
FIG. 14 is a flowchart showing the operation of an intermediate file generation section shown in FIG. 3.
Figure 15:
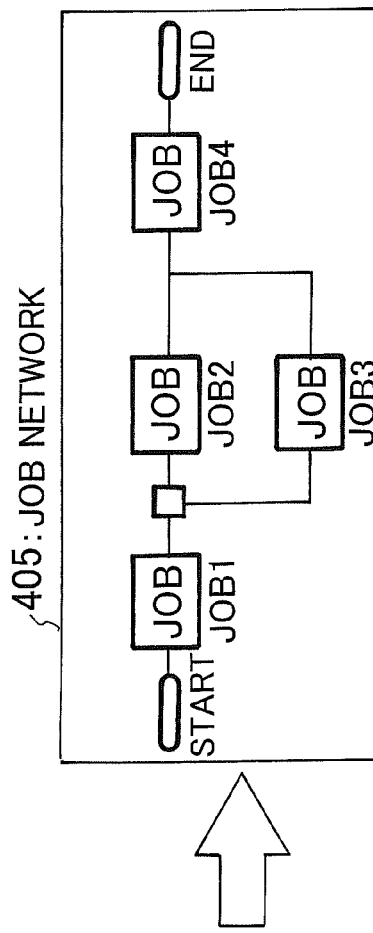
FIG. 15 is a view showing that an intermediate file is generated from the JCL and a job network is generated from the generated intermediate file.

The operation of the JCL/intermediate file converter 111 will be described with reference to FIG. 3. The JCL file input section 111-1 reads out a JCL file to be converted from the first storage unit 101 with reference to a list of JCL files to be converted received from the JCL file dependency output section 109. The intermediate file generation section 111-3 converts the JCL file into an intermediate file while referring to the conversion dictionary 111-7. A correspondence table between JCL and shell script is stored in the conversion dictionary 111-7. Commands of respective OSes corresponding to conversion target-JCL commands are stored in the conversion dictionary. The intermediate file generation section 111-3 performs processing according to the flowchart shown in FIG. 14. First, the intermediate file generation section 111-3 reads a JCL line by line and compares a target line with the conversion dictionary (steps S313, S315, S317, and S319). When there is a corresponding JCL command, conversion is performed and a result of the dictionary search is output to the converted intermediate file; while when there is no corresponding JCL command, the line to be converted is output without modification (steps S323 and S325). At this time, the JCL command corresponding to the conversion target line is commented out as a comment line (e.g., in UNIX®, "#" line) which is used for an input line for the subsequent flow conversion. This processing is repeated until EOF (End Of File) of the JCL file is reached (steps S313, S315, S317, S319, S321, S323, and S325). After EOF is reached, the created intermediate file is sent to an intermediate file/job network converter 1137 as the conversion result. An example in which JCL/intermediate file conversion is actually performed is shown in FIG. 15. By applying the processing of FIG. 14 to a JCL 401, an intermediate file 403 can be obtained. Ordinary JCL lines (actual processing 1 (JCL) to actual processing 4 (JCL)) are converted into shell script (in this example, UNIX® shell) conforming to a conversion destination OS. Further, specific JCL lines (¥JOB, ¥SUBJOB, and the like) representing order relation are left intact as a comment.

The operation of the intermediate file/job network converter 113 will be described with reference to FIG. 4. The intermediate file input section 113-1 sends an intermediate file group received from the JCL/intermediate file converter 111 to the intermediate file analysis section 113-3. The operation of the intermediate file analysis section 113-3 is shown in the flowcharts of FIGS. 16, 17, 18, 19, and 20.

Figure 16:
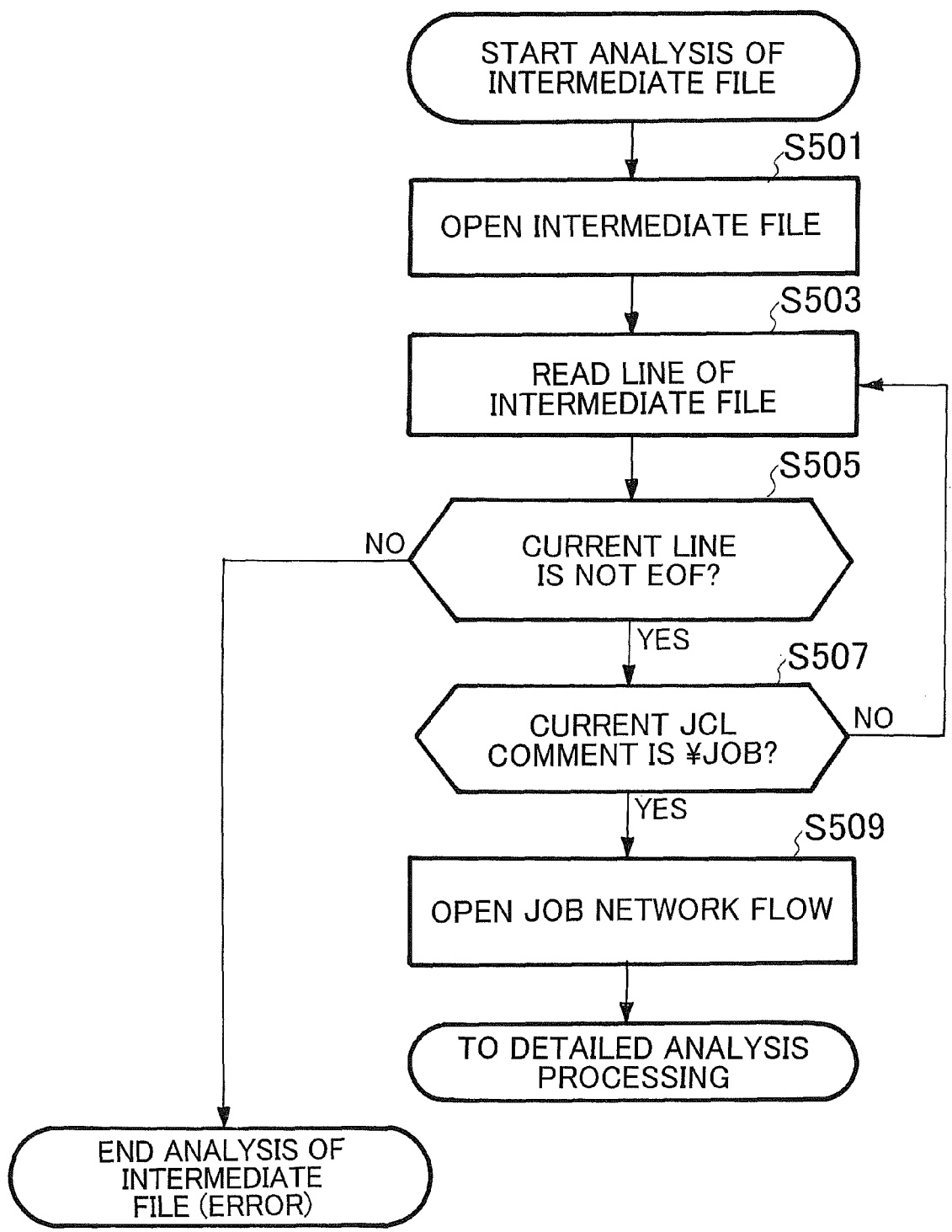
FIG. 16 is a flowchart (1/5) showing the operation of the intermediate file analysis section shown in FIG. 4.
Figure 17:
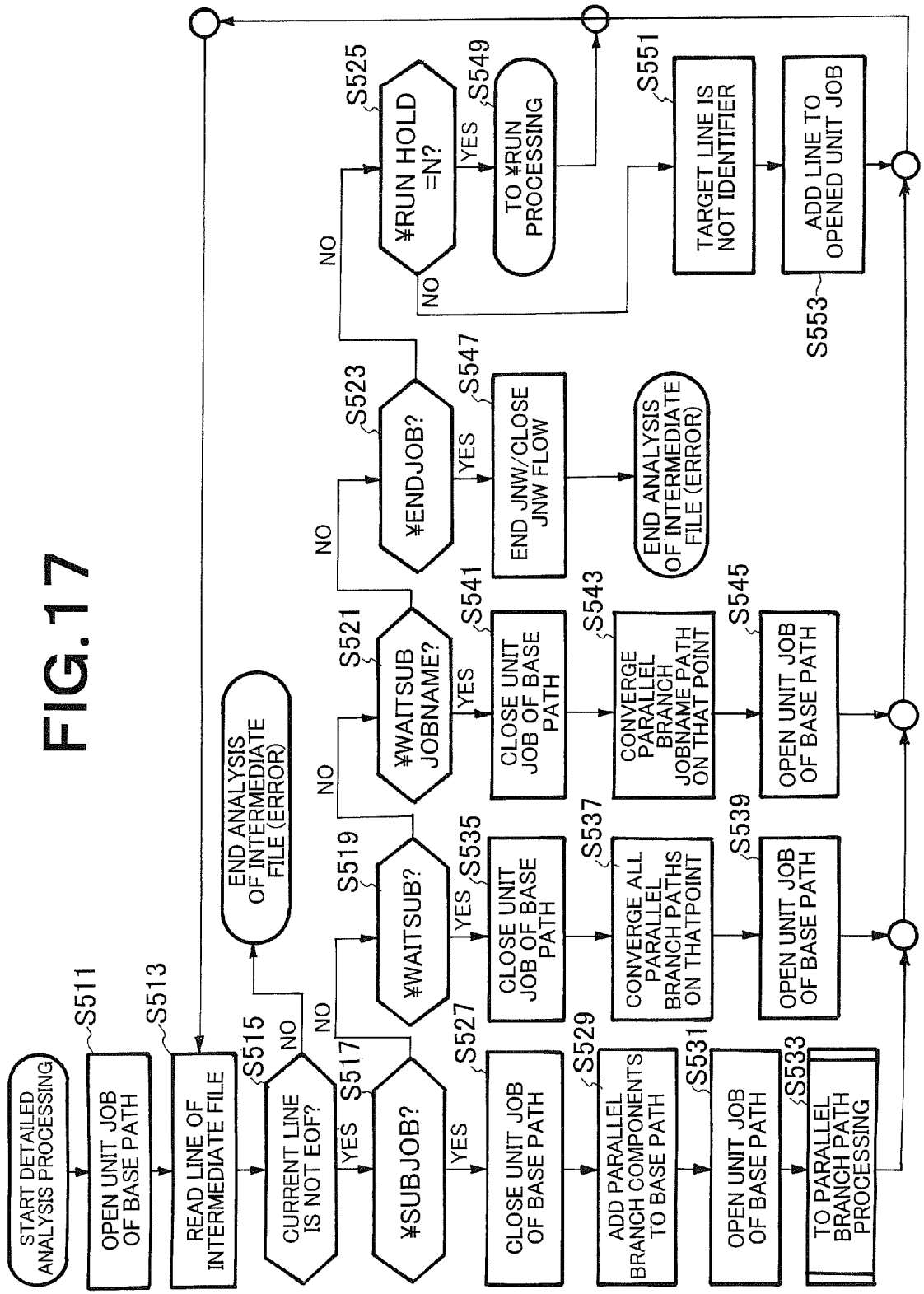
FIG. 17 is a flowchart (2/5) showing the operation of the intermediate file analysis section shown in FIG. 4.
Figure 18:
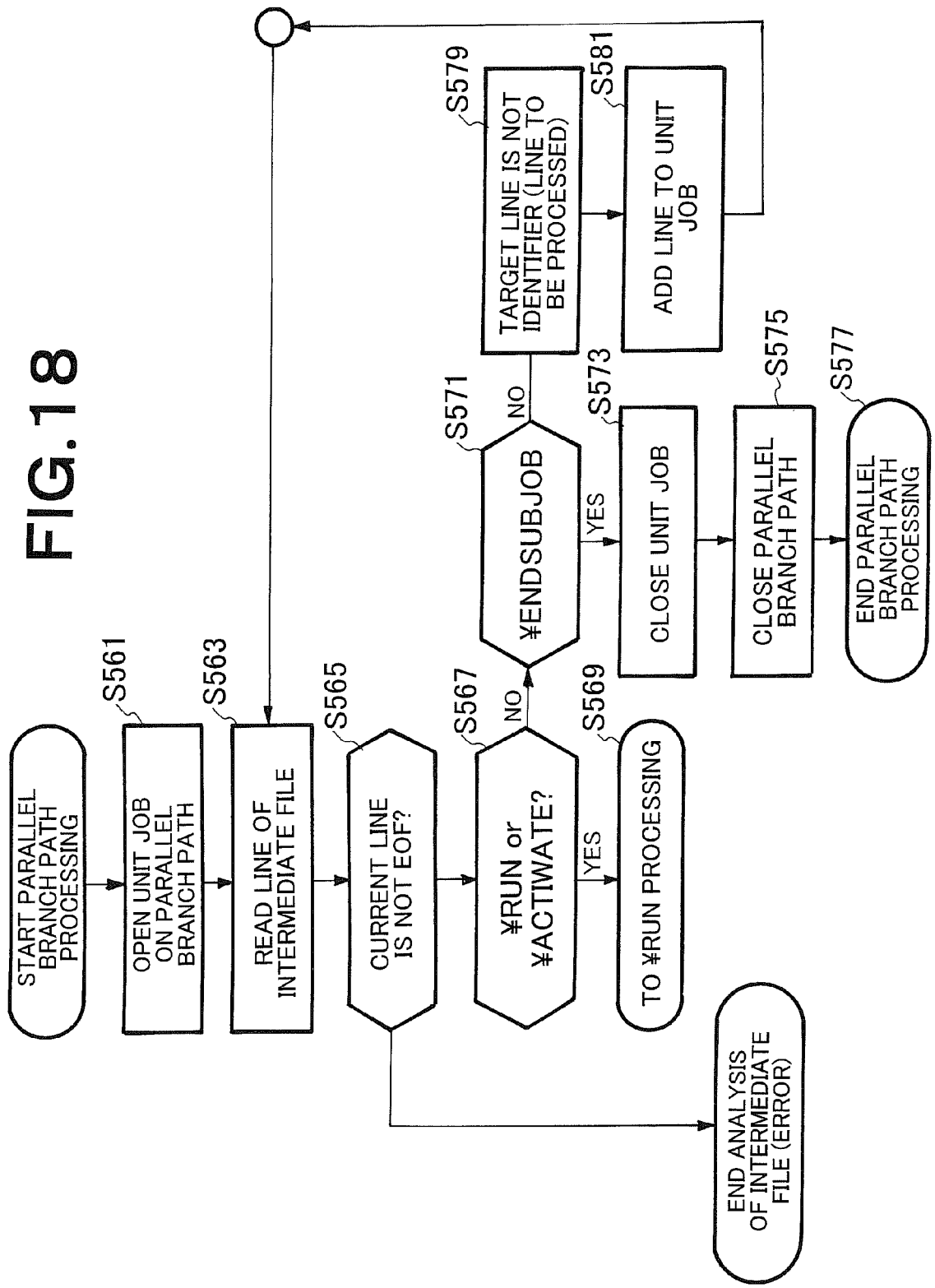
FIG. 18 is a flowchart (3/5) showing the operation of the intermediate file analysis section shown in FIG. 4.
Figure 19:
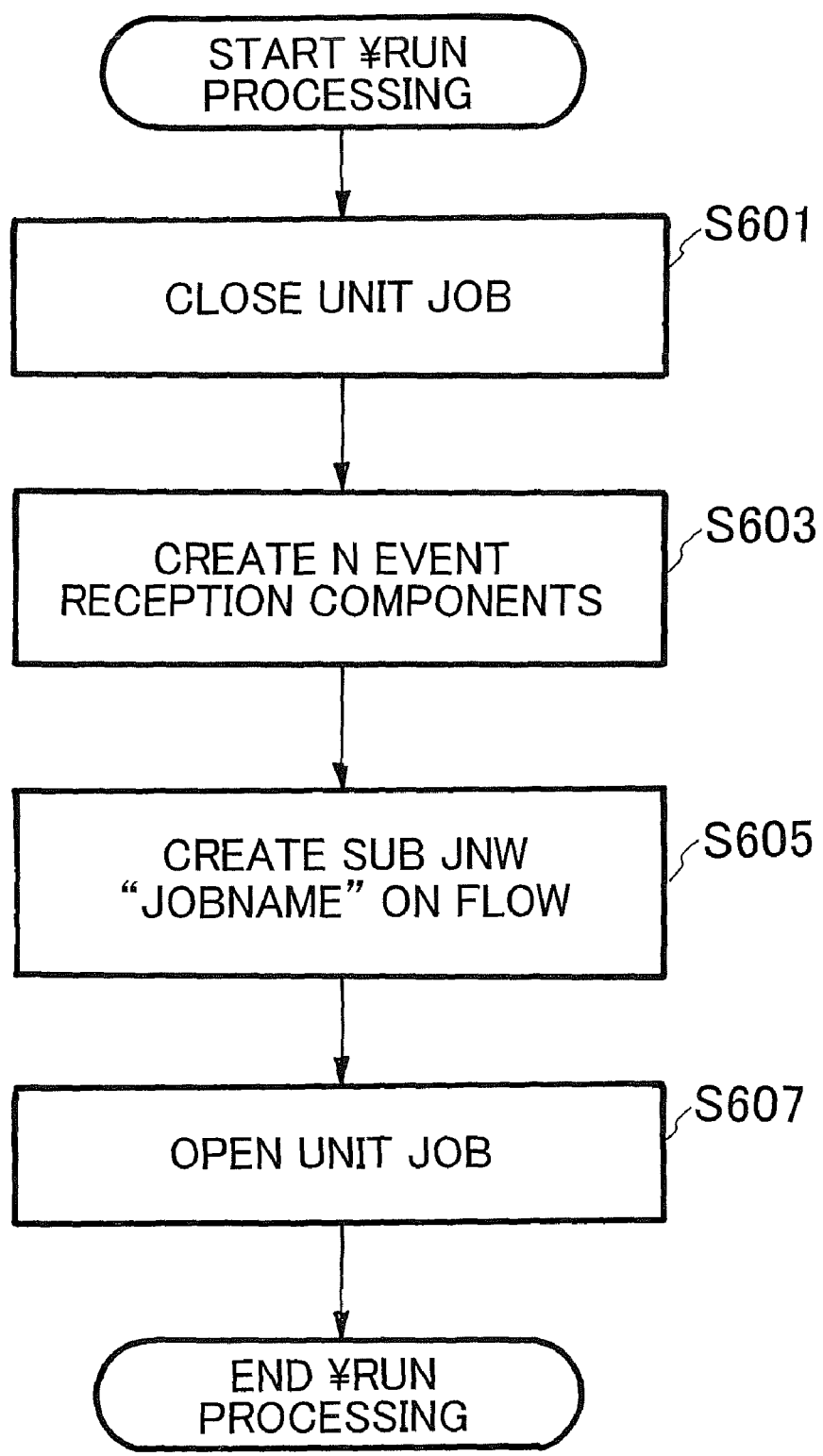
FIG. 19 is a flowchart (4/5) showing the operation of the intermediate file analysis section shown in FIG. 4.

Initial operation is shown in FIG. 16. The intermediate file analysis section 113-3 reads the intermediate file line by line (S503) and detects, among the commented out JCL commands, JCL comments related to order control. The intermediate file analysis section 113-3 first searches for ¥JOB line which is the start line of the JCL (S507). After detecting the ¥JOB, the intermediate file analysis section 113-3 performs detailed analysis processing. FIG. 17 shows the operation of the detailed analysis processing. The intermediate file analysis section 113-3 detects specific JCL command lines such as ¥SUBJOB, ¥WAITSUB, ¥ENDJOB, and ¥RUN from the commented out JCL commands, performs corresponding processing, and registers corresponding job network components in a memory as a link structure. After detecting ¥ENDJOB, the intermediate file analysis section 113-3 closes links on the memory. An example in which the intermediate file/job network conversion is actually performed is shown in FIG. 15. By applying conversion processing to an intermediate file 403 according to the flowchart, a link structure 405 can be obtained. The actual processing 1 to 3 serve as elements constituting JOB1 to JOB4, respectively.

Figure 20:
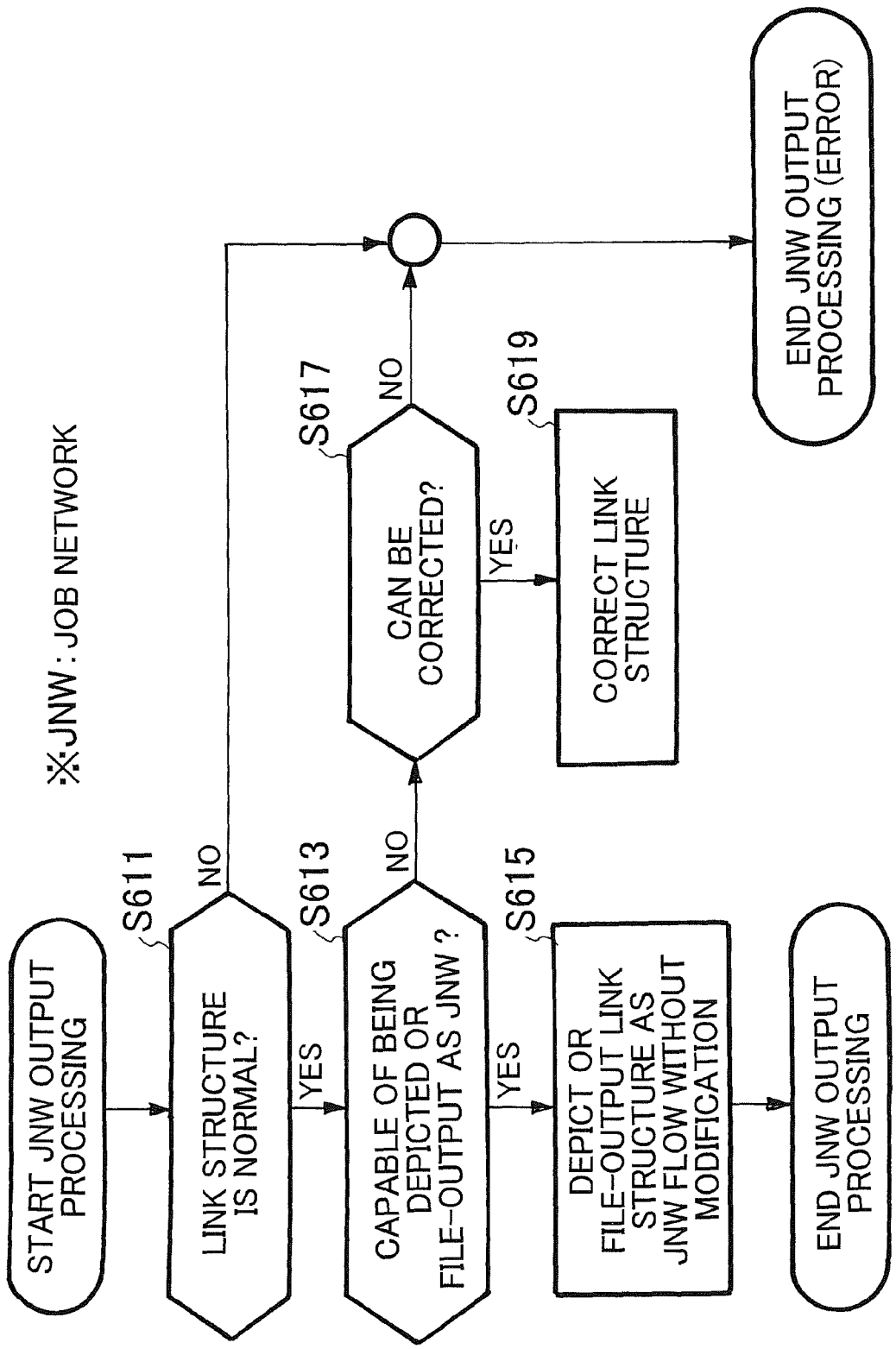
FIG. 20 is a flowchart (5/5) showing the operation of the intermediate file analysis section shown in FIG. 4.

The job network output section 113-5 outputs the links developed on the memory as a flow. FIG. 20 shows the operation. Data expressed as a link structure has been made equivalent to a flow diagram and, thus, can be output as a job network flow through a simple checking whether the data can be depicted/file-output.

According to the embodiment of the present invention the following effects can be obtained.

A first effect is that the present program makes the risk of occurrence of an error due to dependency between the JCL files extremely low in the migration work from the JCL to job network and the like, thereby significantly reducing test man-hours.

The reason for the above is that it is logically guaranteed that in a job network automatically generated by the present program, there is no dependency, or, if there is any dependency, the dependency has fully been solved.

A second effect is that the present program enables complete automatic conversion from the JCL to job network, thereby significantly reducing cost and risk incurred by the system migration from Mainframe to Open-system.

The reason for the above is that the problem of dependency between files, which is the greatest obstacle for JCL-job network automatic conversion, is dissolved.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A method for converting job control files described in job control language to job networks, comprising:
   adding to a logical expression group a logical expression, a condition part of said logical expression includes a logical product of one or more preceding job control language files, a result part of said logical expression includes an anteceding job control language file, execution of said one or more preceding job control language files being necessary to be completed before execution of said anteceding job control language file is started, if a target job control language file has said one or more preceding job control language files and said target job control language files is regarded as said anteceding job control language file, for each of target job control language files;
   adding to an initial base file set said target job control language file, if said target job control language file does not have any anteceding job control language file, execution of which is necessary to be completed before execution of said target job control language file is started, for each of the target job control language files;
   repeating a process, for each of said logical expressions in said logical expression group, in which said preceding job control language file is deleted from said condition part of said logical expression if said preceding job control language file is included in said base file set, and in which said anteceding job control language file is added to said base file set and said logical expression is deleted from said logical expression group if all preceding job control language files have been deleted from said condition part of said logical expression, until the addition of said anteceding job control language file to said base file set and the deletion of said logical expression from said logical expression group become unexecutable; and
   converting said job control language files included in said base file set into the job networks.

2. The method according to claim 1, wherein converting said job control language files into the job networks comprises:
   generating an intermediate file comprising one or more operating system instructions, each of which corresponds to each of job control language instructions included in each of job control language files included in said base file set.

3. The method according to claim 2, comprising:
   wherein converting said job control language files into the job networks further comprises:
   converting said intermediate file to a job network flow, comprising:
   detecting job control language instructions which are related to order control, from said intermediate file; and
   dividing said intermediate file into parts by executing processes which are related to the detected job control instructions.

4. An apparatus for converting job control files described in job control language to job networks, said apparatus is embodied by a computer reading a computer program from a computer-readable medium and executing the computer program, said apparatus comprising:
   a device for adding to a logical expression group a logical expression, a condition part of said logical expression includes a logical product of one or more preceding job control language files, a result part of said logical expression includes an anteceding job control language file, execution of said one or more preceding job control language files being necessary to be completed before execution of said anteceding job control language file is started, if a target job control language file has said one or more preceding job control language files and said target job control language files is regarded as said anteceding job control language file, for each of target job control language files;
   a device for adding to an initial base file set said target job control language file, if said target job control language file does not have any anteceding job control language file, execution of which is necessary to be completed before execution of said target job control language file is started, for each of the target job control language files;
   a device for repeating a process, for each of said logical expressions in said logical expression group, in which said preceding job control language file is deleted from said condition part of said logical expression if said preceding job control language file is included in said base file set, and in which said anteceding job control language file is added to said base file set and said logical expression is deleted from said logical expression group if all preceding job control language files have been deleted from said condition part of said logical expression, until the addition of said anteceding job control language file to said base file set and the deletion of said logical expression from said logical expression group become unexecutable; and
   a device for converting said job control language files included in said base file set into the job networks.

5. The apparatus according to claim 4,
   wherein said device for converting said job control language files into the job networks comprises:
   a device for generating an intermediate file comprising one or more operating system instructions, each of which corresponds to each of job control language instructions included in each of job control language files included in said base file set.

6. The apparatus according to claim 5,
   wherein said device for converting said job control language files into the job networks further comprises:
   a device for converting said intermediate file to a job network flow, comprising:
   a device for detecting job control language instructions which are related to order control, from said intermediate file; and
   a device for dividing said intermediate file into parts by executing processes which are related to the detected job control instructions.

7. A non-transitory computer-readable medium embodying a computer program for causing a computer to execute a method for converting job control files described in job control language to job networks, said method comprising:
- adding to a logical expression group a logical expression, a condition part of said logical expression includes a logical product of one or more preceding job control language files, a result part of said logical expression includes an anteceding job control language file, execution of said one or more preceding job control language files being necessary to be completed before execution of said anteceding job control language file is started, if a target job control language file has said one or more preceding job control language files and said target job control language files is regarded as said anteceding job control language file, for each of target job control language files;
- adding to an initial base file set said target job control language file, if said target job control language file does not have any anteceding job control language file, execution of which is necessary to be completed before execution of said target job control language file is started, for each of the target job control language files;
- repeating a process, for each of said logical expressions in said logical expression group, in which said preceding job control language file is deleted from said condition part of said logical expression if said preceding job control language file is included in said base file set, and in which said anteceding job control language file is added to said base file set and said logical expression is deleted from said logical expression group if all preceding job control language files have been deleted from said condition part of said logical expression, until the addition of said anteceding job control language file to said base file set and the deletion of said logical expression from said logical expression group become unexecutable; and
- converting said job control language files included in said base file set into the job networks.

8. The non-transitory computer-readable medium according to claim 7, wherein converting said job control language files into the job networks comprises:
- generating an intermediate file comprising one or more operating system instructions, each of which corresponds to each of job control language instructions included in each of job control language files included in said base file set.

9. The non-transitory computer-readable medium according to claim 8, wherein converting said job control language files into the job networks further comprises:
- converting said intermediate file to a job network flow, comprising:
  - detecting job control language instructions which are related to order control, from said intermediate file; and
  - dividing said intermediate file into parts by executing processes which are related to the detected job control instructions.

* * * * *